June 19, 1962 R. M. EVANS ET AL 3,040,034
16-METHYL STEROIDS AND PROCESS OF PREPARING THE SAME
Filed July 15, 1960 2 Sheets-Sheet 1
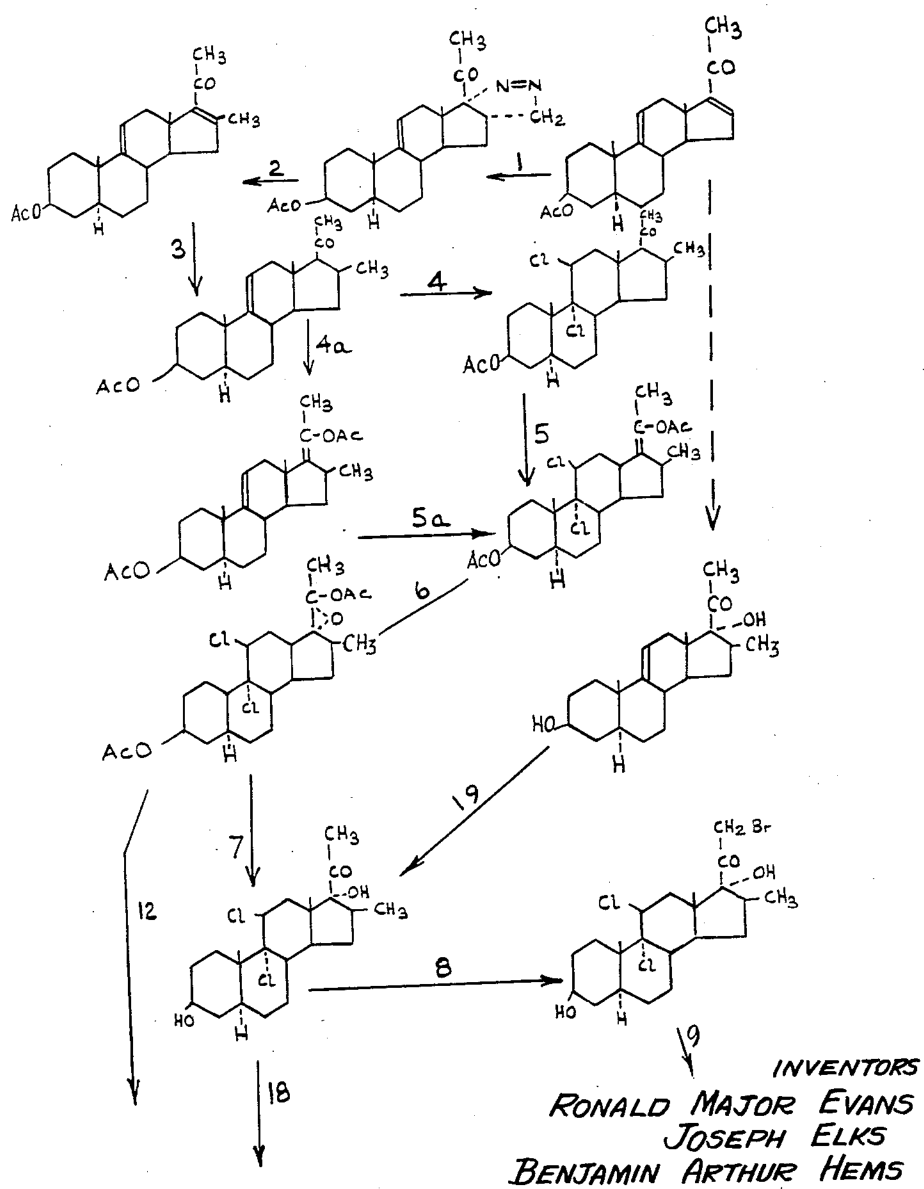
INVENTORS
RONALD MAJOR EVANS
JOSEPH ELKS
BENJAMIN ARTHUR HEMS
WILLIAM GRAHAM
JOHN FRANCIS OUGHTON
GORDON IAN GREGORY
THOMAS WALKER
JOHN SELWYN HUNT
BY Bacon & Thomas Attorneys 16-METHYL STEROIDS AND PROCESS OF PREPARING THE SAME
Filed July 15, 1960 2 Sheets-Sheet 2
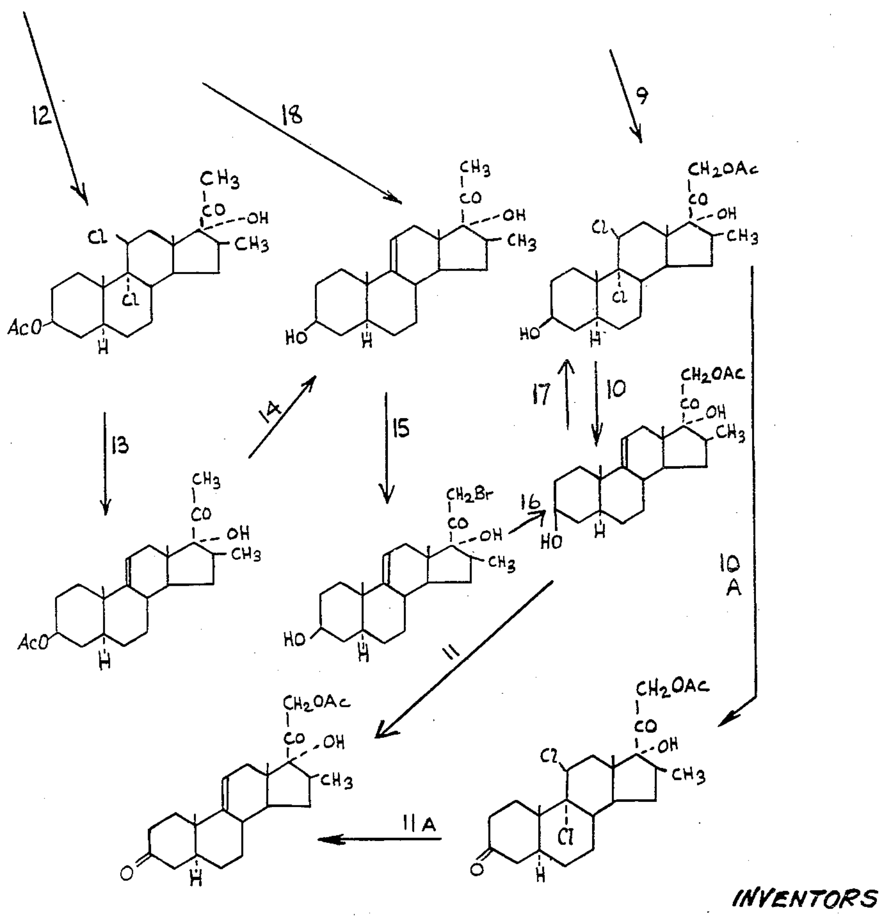
*INVENTORS*
RONALD MAJOR EVANS
JOSEPH ELKS
BENJAMIN ARTHUR HEMS
WILLIAM GRAHAM
JOHN FRANCIS OUGHTON
GORDON IAN GREGORY
THOMAS WALKER
JOHN SELWYN HUNT
By Bacon & Thomas
*Attorneys*

United States Patent Office 3,040,034

Patented June 19, 1962

1

3,040,034

16-METHYL STEROIDS AND PROCESS OF PREPARING THE SAME

Ronald Major Evans, Ickenham, Joseph Elks, Golders Green, London, Benjamin Arthur Hems, Ickenham, William Graham, Greenford, John Francis Oughton, Gerrards Cross, Gordon Ian Gregory, Chalfont St. Peter, and Thomas Walker, Wembley, England, and John Selwyn Hunt, Montrose, Angus, Scotland, assignors to Glaxo Laboratories Limited, Greenford, England, a British company Filed July 15, 1960, Ser. No. 43,095

Claims priority, application Great Britain July 20, 1959

15 Claims. (Cl. 260—239.55)

This invention is concerned with improvements in or relating to the preparation of steroid compounds, and, more particularly, with the preparation of 16-methyl steroid compounds possessing anti-inflammatory and/or adrenocortical activity, analogues thereof and intermediates therefor.

Various steroids having a methyl group in the α-or β-configuration in the 16-position have been described as having important pharmacological properties and, in general, are said to possess more pronounced anti-inflammatory properties and less undesirable side effects than the corresponding steroids not possessing the 16-methyl group. The preparation of such compounds has hence become of importance.

The preparation of 16-methyl steroids from 11-keto steroids of the 5β-pregnane series has been described. However, some substances readily available and hitherto used as starting materials for the manufacture of adrenocortical hormones are members of the 5α-series, an important example of such a substance being hecogenin.

It is thus an object of the present invention to provide an advantageous route to 16-methyl steroids which utilises as starting material a Δ9(11):16-diene steroid of the 5α-series which can readily be obtained by the degradation of hecogenin and other naturally occurring 5α-steroids.

It is known that hecogenin acetate can be converted in several steps to form 3β-acyloxy-5α-pregna-9(11):16-dien-20-one (cf. Djerassi et al., J. Org. Chem., 1951, 16, 1278, and Callow and James, J.C.S., 1956, 4739).

We have used 3β-acyloxy-5α-pregna-9(11):16-dien-20-ones as starting materials for a multi-stage procedure leading to further intermediates containing a 16(α or β)-methyl group which in turn can be converted in a few further stages to desired 16-methyl steroids e.g. 9α-fluoro-16(α or β)-methyl prednisolone acetate.

However, when using intermediates of the aforesaid nature the difficulty arises that the 9(11)-positions are liable to be attacked by the various reagents which must be used during the synthesis. For example, it may be necessary at one stage to epoxidise an enol acylate possessing unsaturation at the 17(20) positions and this would also result in epoxidation of the 9(11)-double bond leading to an undesired 9α:11α-oxide grouping. Steps, therefore, must be taken to protect the 9(11)-double bond so that it can be utilised at a further stage of the synthesis. We have found that a most convenient method of achieving this protection is to form a 9α:11β-dichloro derivative. This can readily be achieved by direct chlorination of the $\Delta^{9(11)}$ compound. The resulting dichloro compound is stable to a variety of reagents and, after the desired reactions have been effected, the chlorine atoms may be removed and the 9(11)-unsaturation reintroduced. The chlorine atoms can readily be removed by reduction e.g. by catalytic hydrogenation or by "chemical" reducing agents such as zinc/acetic acid or chro-

2 mous chloride. The dichloro compounds are more convenient to use than other halo compounds.

According to the invention, therefore, we provide as new compounds, compounds of the general formula

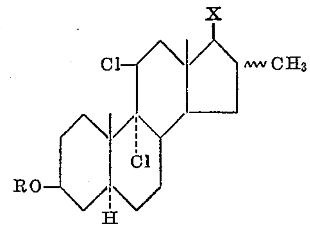

(I)

in which X is one of the following groups

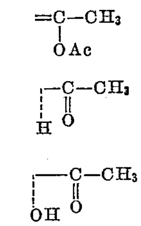

and

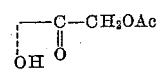

Ac being an acyl group, and R is a hydrogen atom or an acyl group.

Important compounds of general Formula I include 3β:20 - diacetoxy-9α:11β-dichloro-16β-methyl-5α-pregn-17(20) - ene, 3β-acetoxy-9α:11β-dichloro-16β-methyl-5α-pregnan-20-one, 9α:11β-dichloro-3β:17α-dihydroxy-16β-methyl - 5α-pregnan - 20 - one and 21 - acetoxy - 9α:11β-dichloro - 3β:17α - dihydroxy-16β-methyl-5α-pregnan-20-one.

The compounds according to the invention may be prepared by dichlorinating the corresponding $\Delta^{9(11)}$-compound, i.e. a compound of the general formula:

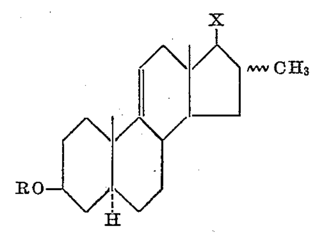

(II)

in which X and R have the meanings defined above. The chlorination is preferably effected by dissolving the starting material in a suitable solvent e.g. methylene dichloride, carbon tetrachloride, chloroform or acetic acid, and then adding the chlorinating agent, e.g. molecular chlorine in gaseous or dissolved form thereto.

Molecular chlorine is the preferred chlorinating agent. Other chlorinating agents useful for this purpose are described in U. S. Patent No. 2,894,963 and include, for example, N-chloro-succinimide or N-chloro-acetamide with, for example, lithium chloride and/or hydrogen chloride.

Difficulties may be experienced in practice due to simultaneous substitution by chlorine elsewhere in the steroid molecule and since these substitution reactions give rise to hydrogen chloride as a by-product, the latter in turn may cause further difficulty elsewhere in the steroid molecule by causing isomerisation. However isomerisation may be inhibited by removing hydrogen chloride as it is formed e.g. by extraction or by neutralisation; thus where the solvent is water-immiscible this may be achieved by adding water to the solvent and simply extracting the hydrogen chloride as it forms into the aqueous layer. Alternatively a base such as a solid alkali metal bicarbonate may be added to the solvent so as to neutralise the hydrogen chloride in situ. Aqueous alkali metal bicarbonate is not very satisfactory as it reacts with chlorine to produce alkali metal hypochlorites. There may, however, be added a substance which functions as a buffer, and thus serves to prevent undue reduction of the pH. Suitable substances for this purpose are alkali metal salts of weak acids e.g. sodium acetate. The buffers may be used in solid form or in aqueous solution.

Chlorine tends to react with methylene chloride under the influence of light and where one is carrying out the reaction under circumstances where light may interfere it is preferred to add the chlorine as a standardised solution in carbon tetrachloride. However, where such difficulties are not encountered gaseous chlorine may be used.

This multi-stage procedure will now be described with reference to 3β-acetoxy-5α-pregna-9(11):16-dien-20-one as starting material for the preparation of 16β-methyl compounds but it will be understood that other 3β-acyloxy compounds can be used if desired, and that 16α-methyl compounds can also be prepared by introducing a 16α-methyl group at an appropriate stage e.g. as described in application No. 43,290, filed July 18, 1960. The procedure is shown in outline in the accompanying flowsheet.

STAGE 1

*Introduction of a Pyrazoline Ring System at the 16(17)-Positions*

Diazomethane reacts with 3β-acetoxy-5α-pregna-9(11):-16-dien-20-one so that it adds on at the 16(17)-positions but not at the 9(11)-positions. This is advantageous in that it leaves the 9(11)-positions with a double bond for subsequent reaction or for protection with other groups. The diazomethane is preferably formed in situ in the reaction mixture e.g. using N:N′-dimethyl-N:N′-dinitrosoterephthalamide or nitrosomethylurea. The reaction with the latter can be carried out at low temperatures e.g. −5° to +20° C. but the reaction with the former takes place at rather higher temperatures.

In the practical application of this stage, the steroid may be dissolved in an inert organic solvent, e.g. a halogenated hydrocarbon such as methylene chloride, and a diazomethane forming substance is added to the reaction mixture and decomposed in situ. Thus, in the case of nitrosomethylurea this may be added to the reaction mixture and maintained in suspension; thereafter it is decomposed, e.g. with an alkali metal hydroxide, at the desired reaction temperature. Alternatively, the diazomethane forming substance may be, if desired, dissolved in an inert organic solvent e.g. dimethyl formamide and added to the reaction mixture, preferably whilst separately adding a solution of an alkali metal hydroxide at a proportional rate. The pyrazoline derivative is recovered from the reaction mixture in any convenient way e.g. by extraction.

STAGE 2

*Decomposition of the Pyrazoline Ring System to Yield a $\Delta^{16(17)}$-16-Methyl Derivative*

Essentially this reaction takes place by heating the steroid-pyrazoline derivative obtained from Stage 1 to cause fission of the pyrazoline ring with consequent evolution of nitrogen leaving a 16-methyl-$\Delta^{16}$ steroid. The reaction is therefore carried out under conditions which ensure that the desired fission ensues without however causing further degradation of the basic steroid molecule. The reaction may therefore be carried out by heating the steroid-pyrazoline derivative in vacuo at a temperature above the melting point of the derivative. Alternatively, the reaction can be conducted in a high boiling inert organic medium, the derivative being either in solution or in dispersion. Thus, for example, the steroid-pyrazoline derivative may be dissolved in a high boiling mineral oil e.g. liquid paraffin and the solution heated at a suitable temperature (for example in the case of the acetoxy compound at about 160° C.) to cause fission of the pyrazoline ring. Preferably, however, the inert organic medium is water-soluble since this facilitates subsequent working-up. For this purpose we have found ethylene glycol, diethylene glycol and dimethyl formamide, particularly diethylene glycol and dimethyl formamide, to be very valuable. Thus, when decomposing the 3β-acetoxy steroid-pyrazoline derivative in diethylene glycol, the reaction takes place readily at about 165° C. and the desired 16-methyl derivative can be recovered by adding water to the partly cooled reaction mixture (from which the 16-methyl derivative may have already begun to crystallise). This results in precipitation of the 16-methyl derivative and the precipitate may be crystallised, e.g. from ethanol. Dimethyl formamide can be used to effect decomposition at about the boiling point of the solvent. The compound obtained from this stage is 3β - acetoxy-16-methyl-5α-pregna-9(11):-16-dien-20-one. This compound may be used as the starting material for the preparation of 16-methyl-17α-hydroxy steroids e.g. by the procedure described in application Nos. 43,290 and 43,268, filed July 18, 1960, or as the starting material in the next stage.

STAGE 3

*Reduction of 3β-Acetoxy-16-Methyl-5α-Pregna-9(11):16-Dien-20-One at the 16(17)-Positions*

We have found that it is possible selectively to reduce 3β-acetoxy-16-methyl-5α-pregna-9(11):16 - dien-20-one at the 16(17)-positions without substantially affecting the 9(11)-double bond.

We achieve this selective reduction by hydrogenation in the presence of a palladium catalyst, preferably on an inert support such as charcoal, kiesel-guhr or calcium carbonate, in basic media. Under these conditions we have achieved selective hydrogenations giving yields of the order of 90% or even better.

The hydrogenation may be conducted at room temperature and pressure.

When the reaction is carried out in acidic media, the hydrogenation of the second double bond takes place readily, and in neutral media more slowly, to give the known 3β-acetoxy-16β-methyl-5α-pregnan-20-one.

The selective reduction is preferably carried out in a neutral solvent which is a good solvent for the steroid, e.g. tetrahydrofuran, containing a base such as an organic amine, for example, triethylamine or pyridine.

As a result of the hydrogenation the 16-methyl group adopts the β-configuration.

STAGE 4

*Chlorination of 3β-Acetoxy-16β-Methyl-5α-Pregn-9(11)-En-20-One*

In Stage 6 the enol acetylated compound is epoxidized at the 17(20)-positions and the conditions employed would also lead to epoxidation of the 9(11)-double bond to give a 9α:11α-oxide grouping. This is in fact undesirable and hence steps must be taken to protect the 9(11)-double bond. We have found that this can conveniently be achieved, as described above, by chlorination of the 3β-acetoxy-16β-methyl-5α-pregn-9(11)-en-20-one to form a 9α:11β-dichloro derivative which can subsequently be dechlorinated at a later stage to restore the 9(11)-double bond.

STAGE 5

*Enol Acetylation of 3β-Acetoxy-9α:11β-Dichloro-16β-Methyl-5α-Pregnan-20-One*

Enol acetylation of the dichloro compound can be conducted by any convenient procedure, but we prefer to use carbon tetrachloride as the reaction medium.

*Alternative Routes to Stages 4 and 5*

We have also investigated the possibility of going through routes 4a and 5a on the flow sheet. The yield of the 9:11-dichloro enol acetate is not quite as good as that obtained by routes 4 and 5. For the chlorination reaction 5a we prefer to use carbon tetrachloride as the solvent and to add the chlorine to the reaction medium as a standardised solution in carbon tetrachloride.

STAGE 6

*Epoxidation of 3β:20-Diacetoxy-9α:11βDichloro-16β-Methyl-5α-Pregn-17(20)-Ene*

This reaction may be achieved by reacting the starting material with an organic peracid e.g. peracetic, performic, perbenzoic or monoperphthalic acid in an inert organic solvent, preferably methylene chloride or chloroform but other solvents may be used including ether, acetic acid, dioxan or benzene.

STAGE 7

*Hydrolysis of 3β:20-Diacetoxy-9α:11β-Dichloro-17:20-Epoxy-16β-Methyl-5α-Pregnane*

The product of Stage 6 is then hydrolysed. One may hydrolyse only the epoxy group e.g. in a medium of sulphuric acid/acetic acid but we prefer to hydrolyse both the epoxy group and the 3-acetoxy group. This is preferably achieved using an alkali, for example sodium methoxide or sodium hydroxide, in an alkanol e.g. methanol, or using sulphuric acid in an alkanol e.g. methanol but owing to the instability of the chloro compound in hot methanol we prefer to carry out the reaction under mild conditions e.g. at room temperature or lower, say, for 16 hours. In order to improve the solubility of the steroid in the reaction medium further solvent e.g. methylene chloride is preferably added.

The product of Stage 7 may, alternatively, be prepared by State 19 as shown in the drawings i.e. by direct chlorination of the corresponding unsaturated $\Delta^{9(11)}$-compound which may be prepared as described in application No. 43,268.

STAGE 8

*Bromination of 3β:17α-Dihydroxy-9α:11β-Dichloro-16β-Methyl-5α-Pregnan-20-One at the 21-Position*

For this reaction we prefer to form a complex of the starting material with hydrogen chloride or hydrogen bromide and brominate the complex, preferably in suspension, in an inert, substantially non-polar organic solvent containing a small proportion e.g. 0.5 to 15% w./v., preferably 6.0 to 9.0% w./v. of an aliphatic, preferably primary or secondary, alcohol, preferably containing 1-8 carbon atoms e.g. ethanol. Suitable organic solvents are chlorinated aliphatic hydrocarbons such as chloroform, methylene chloride, tetrachloroethane, and carbon tetrachloride and hydrocarbon solvents such as benzene and petroleum. The reaction may be carried out at a temperature between 10° and 35° C.

If an aqueous solution of a weak alkali e.g. sodium bicarbonate is added at the end of the reaction, the steroid-acid complex appears to be broken down and the 21-bromide crystallises from the reaction medium in very good yield in a substantially pure form. Additional 21-bromide may be obtained by working up the filtrate (e.g. by washing the chloroform solution, evaporation and crystallisation of the residue), but additional material obtained in this way is not quite so pure and requires recrystallisation.

STAGE 9

*Acetoxylation of the 21-Bromo Compound*

The resulting 21-bromo compound from Stage 8 may be converted into the corresponding 21-acetate by treatment with potassium acetate e.g. in acetone solution.

STAGE 10

*Dechlorination of 21-Acetoxy-9α:11β-Dichloro-3β:17α-Dihydroxy-16β-Methyl-5α-Pregnan-20-One*

This reaction may be achieved by the use of various reducing agents e.g. chromous chloride or zinc/acetic acid or by reducing with hydrogen in the presence of a palladium catalyst, preferably supported on an inert carrier e.g. charcoal, kieselguhr or calcium carbonate under neutral or, preferably, basic conditions. By reducing in this manner we can achieve dechlorination without, however, saturating the 9(11)-positions and are thus able to restore the $\Delta^{9(11)}$ double bond. It is to be noted that by reducing catalytically under acid conditions the 9(11)-positions become saturated.

The reaction medium for the hydrogenolysis is preferably a neutral solvent e.g. tetrahydrofuran containing an organic primary, secondary or tertiary base, e.g. triethylamine.

The reduction is preferably carried out at room temperature and pressure although a slight increase in either temperature or pressure may be used, if desired.

STAGE 11

*Oxidation of 21-Acetoxy-3β:17α-Dihydroxy-16β-Methyl-5α-Pregn-9(11)-En-20-One*

The dechlorinated compound is then oxidised to form 21 - acetoxy - 17α - hydroxy - 16β - methyl - 5α - pregn - 9(11)-ene-3:20-dione.

The latter compound may be converted into 9α-fluoro-16β-methyl prednisolone acetate by the steps of brominating and dehydrobrominating in ring A to from a $\Delta^{1:4}$ steroid, expoxidising the 9(11)-double bond and reacting the epoxide group with hydrogen fluoride to form a 9α-fluoro-11β-hydroxy steroid. However, the oxidised compound may be used as an intermediate for the preparation of other 16β-methyl steroids e.g. 16β-methyl cortisone acetate or 16β-methyl prednisone acetate.

*Alternative Route to Stages 7–9 (Stages 12–17)*

After the epoxidation step in Stage 6, the epoxy steroid may be subjected to the steps of partially hydrolysing to form 3β - acetoxy - 9α:11β - dichloro - 17α - hydroxy - 16β-methyl-5α-pregnan-20-one (Stage 12), reducing the latter e.g. by the method of Stage 10 to form 3β-acetoxy-17α-hydroxy-16β-methyl-5α-pregn-9(11)-en-20-one (Stage 13), hydrolysing the latter at the 3-position (Stage 14), e.g. using an alkali metal bicarbonate or the method of Stage 7, brominating the latter steroid at the 21-position (Stage 15), acetoxylating the 21-bromo compound (Stage 16) e.g. by the method of Stage 9 and chlorinating the 21-acetoxy compound (Stage 17) to give the end product of Stage 9.

*Alternative Route to Stages 12–14 (Stage 18)*

Instead of using Stages 12–14 to produce 3β:17α-dihydroxy-16β-methyl-5α-pregn-9(11)-en-20-one, this may be produced directly from the product of Stage 7 by dechlorination e.g. by the method of Stage 10.

*Alternative Route to Stages 10 and 11*

The yield obtained in the oxidation of the 3-hydroxy group may be improved if the 9:11-chloro atoms are not removed at Stage 10 but are retained until after the oxidation reaction. In effect, therefore, Stages 10 and 11 are reversed and are shown on the accompanying flow sheet as Stages 10A and 11A.

In Stages 10A and 11 the oxidation may be brought about by any convenient method. Two methods which we have found to be suitable are (*a*) the use of chlorine in acetic acid buffered e.g. with sodium acetate and (*b*) that described by Bowers et al., J. Chem. Soc., 1953, 2555.

The overall yield in Stages 10A and 11A appears to show considerable improvement over that obtained from Stages 10 and 11.

In order that the invention may be well understood the following examples are given by way of illustration only. In these examples temperatures were measured in degrees centigrade.

EXAMPLE 1 (STAGE 1)

*3β-Acetoxy-1'-Pyrazolino-(3':4'-17:16α)-5α-Pregn-9(11)-En-20-One*

Alternative procedures:

(*a*) Nitrosomethylurea (80 g.) was added to a solution of 3β-acetoxy-5α-pregn-9(11):16-dien-20-one (104 g.) in methylene chloride (1.0 litre) and the mixture cooled with stirring to −5° in a methanol/solid $CO_2$ bath. A 50% aqueous solution of potassium hydroxide (160 ml.) was then added over about ½ hr. to the stirred suspension, the temperature being maintained at about −5°. When the addition was complete, the cooling bath was removed and the temperature of the solution allowed to rise to room temperature (about 2 hr.). Water (1.5 litres) was added slowly and the mixture stirred vigorously for 15 mins. during which time most of the yellow colour was discharged. The methylene chloride layer was separated and the upper aqueous phase extracted with methylene chloride (1×300 ml.) this extract being used as a backwash. The organic phase was washed with water (3×350 ml.) bulked with the backwash and evaporated to dryness under reduced pressure. The residue (about 99% yield, M.P. 153° C.) was triturated with petroleum ether (B.P. 100–120°) (750 ml.) and re-evaporated to about 500 ml. to ensure the removal of the last traces of methylene chloride. The solution was cooled to room temperature and the solid filtered off, washed with a little petroleum ether (B.P. 100–120°) and dried in vacuo at 100° to yield the pyrazoline of 3β-acetoxy-5α-pregna-9(11):16-dien-20-one (106.5 g., 92% yield), M.P. 158° dec., $[\alpha]_D+72°$ (c., 1 in $CHCl_3$) λmax=229 mμ and $$E^{1\%}_{1\,cm.}=29.3$$

(*b*) A solution of nitrosomethylurea (1.33 kg.) in dimethylformamide (4.2 litres) at 20° C. was clarified by filtration through kieselguhr to remove traces of inorganic salts and other solids. A solution of potassium hydroxide (1.2 kg.) in distilled water (2 litres) was also prepared, cooled to ca. 15° C., and carefully decanted from insoluble particles. A solution of 3β-acetoxy-5α-pregna-9(11):16-dien-20-one (2.5 kg.) in methylene chloride (16 litres) was clarified by filtration through kieselguhr and charged to a 50 litre 4-neck round bottom glass flask, immersed in a bath of methanol. The steroid solution was stirred with a stainless steel impeller and cooled to ca. 15° C. by the addition of solid carbon dioxide to the cooling bath. The nitrosomethylurea and caustic potash solutions were introduced at separate points over the surface of the diene solution at rates proportional to their volumes, the total rate of the addition being controlled so that the temperature of the reaction mixture was maintained at 15–17° C. with the external coolant at ca. −5° C. (30–40 minutes). The reaction mixture was warmed to 23° C. and held at that temperature for 30 minutes. Water (20 litres) was added, the mixture vigorously stirred while a current of nitrogen was passed through, for ca. 30 minutes, in order to expel the excess of diazomethane. The methylene chloride phase was separated, and the aqueous phase re-extracted with the solvent (7 litres). The main extract was washed with water (2×20 litres) 0.25 N-hydrochloric acid (20 litres) and finally with water (20 litres) to neutrality. The second extract was used to re-extract the aqueous washes. The extracts were combined and the bulk of the solvent distilled off. Methanol, (4 litres) was added and the distillation continued, under reduced pressure, until no methylene chloride remained. The residual slurry was filtered off, the crystals of the 16:17-pyrazolino compound washed with cold methanol and dried at 60° in the air oven (2.63 kg. 93.8%) M.P. 158° C. (decomp.), $[\alpha]_D+71°$ (c., 1.0 in chloroform), $$\lambda^{EtOH}_{max.}=225\ m\mu\ (E^{1\%}_{1\,cm.}=40.5)$$

EXAMPLE 2 (STAGE 2)

*3β-Acetoxy-16-Methyl-5α-Pregna-9(11):16 Dien-20-One*

(*a*) *Using liquid paraffin.*—The pyrazoline (5 g.) obtained in Example 1(*a*) was added portionwise with stirring to liquid paraffin (20 ml.) maintained at 160°. The solution was stirred at this temperature until the evolution of the nitrogen ceased (about 10 min.) cooled to room temperature and petroleum ether (B.P. 100–120°) (50 ml.) added. The solution was refrigerated for several hours and the resulting solid filtered off, washed with a little petroleum ether (B.P. 100–120°) and dried at 80° for 1 hr. to yield 3β-acetoxy-16-methyl-5α-pregna-9(11):16-dien-20-one (1.81 g.), M.P. 135–138° $[\alpha]_D+49.5°$ (c., 1 in $CHCl_3$) and λmax.=249.5 mμ, $$E^{1\%}_{1\,cm.}=228$$

The product was recrystallised from ethanol (4 ml.), refrigerated and the solid filtered off, washed with cold ethanol (1×1 ml.) and dried in vacuo at 60°.

Wt.=1.15 g., M.P. 139–142°, $[\alpha]_D=+49.5°$ (c., 1 in $CHCl_3$) and λmax.=249.5 mμ, $$E^{1\%}_{1\,cm.}=235$$

(*b*) *Using ethylene glycol.*—The pyrazoline (48 g.) obtained in Example 1(*a*) was added portionwise with stirring to ethylene glycol (200 ml.) heated at 160–165°. During the addition, which took about 5 min., a vigorous decomposition occurred. The mixture was maintained at about 165° for a further 10 min. after the addition was complete and then cooled. The oily droplets suspended in the ethylene glycol began to solidify at about 100° and water (600 ml.) was added. The mixture was cooled to room temperature and the precipitated solid extracted with methylene chloride (1×200 ml.; 3×50 ml.). The first three extracts were washed with water (2×200 ml.) and the combined aqueous phases back-washed with the fourth extract. The organic extracts were bulked, evaporated to dryness and the solid residue dissolved in methanol (ca. 60 ml.) and a little distilled in vacuo to remove any residual methylene chloride. The solution was refrigerated overnight and the solid filtered off, and dried in vacuo at 100°.

Wt.=31.7 g. (71% yield) M.P. 138–140° and $[\alpha]_D+50°$ (c., 1 in $CHCl_3$) λmax.=249.5 mμ, $$E^{1\%}_{1\,cm.}=224$$

(*c*) *Using diethylene glycol.*—The pyrazoline (222 g.) obtained as in Example 1(*a*) was added portionwise (over about 25 min.) with stirring, to diethylene glycol (880 ml.) at 165°. The solution was stirred for a further 15 min. at this temperature until the evolution of nitrogen had ceased and the mixture was then cooled to about 100° when crystallisation commenced. Water (3.0 litres) was then added slowly with vigorous stirring and the precipitated solid filtered off, washed with water and dried in vacuo at 100°. The product was crystallised from ethanol (210 ml.), allowed to stand overnight at room temperature, filtered off, washed with 20% aqueous ethanol (20 ml.) and then with 50% aqueous ethanol (100 ml.) and dried at 100° in vacuo to yield 3β-acetoxy-16-methyl-5α-pregn-9(11):16-dien-20-one (146 g., 71% yield) M.P. 139–142°, $[\alpha]_D+53°$ (c., 1 in $CHCl_3$), λmax.=249 mμ

$$E^{1\%}_{1\,cm.}=235$$

(*d*) *Using dimethylformamide.*—A suspension of the 16:17-pyrazoline (2.5 kg.) in dimethylformamide (8 litres) was stirred and heated cautiously to reflux temperature (152°). Vigorous evolution of nitrogen occurred at 130–140°. The solution was refluxed for 1 hour after which time nitrogen evolution had ceased. Dimethylformamide (5 litres) was distilled off under reduced pressure, and water (11 litres) added, very slowly at first and with vigorous stirring. The crude 16-methyl diene which precipitated was collected by filtration washed with water and dried at 70°. Recrystallisation from industrial methylated spirits (2.7 litres) gave the pure compound, which was washed with dilute industrial methylated spirits and dried at 70°. (1.63 kg.. 70.3%) M.P. 139–142°, $[\alpha]_D+47.7°$ (c., 1.0 in chloroform), $$\lambda_{max.}^{EtOH}=251\ m\mu\ (E_{1\ cm.}^{1\%}=230)$$

EXAMPLE 3 (STAGE 3)

*3β-Acetoxy-16β-Methyl-5α-Pregna-9(11)-En-20-One*

(*1*) *Without pre-reduction of catalyst.*—3β-acetoxy-16β-methyl-5α-pregn-9:16-dien-20-one (2 kg.) dissolved in tetrahydrofuran (12 litres), with triethylamine (2 litres) as base, was hydrogenated at atmospheric pressure and room temperature using 10% palladium oxide on charcoal (170 g.) as catalyst. The uptake of hydrogen was 139.8 litres in 150 mins.

The catalyst was removed by filtration through kieselguhr and the solvent removed under reduced pressure. The residue was treated with methanol (2 litres) and the methanol also removed under reduced pressure. The solid residue was dried at 40° overnight in vacuo to give crude 3β-acetoxy-16β-methyl-5α-pregn-9(11)-en-20-one (1999 g.; 99.4%), M.P. 106–110°, $[\alpha]_D+30.2°$ (c., 1% in chloroform).

Instead of adding methanol (2 litres) to the residue after removal of the tetrahydrofuran, the residue may be dissolved in acetone (1,600 ml. per kg. of steroid), and water (3,200 ml.) added slowly with vigorous stirring. The crystalline solid may be filtered off and dried to constant weight. There is no great loss of material by this procedure.

(*2*) *With pre-reduction of catalyst.*—10% palladium oxide on charcoal (0.85 g.), in tetrahydrofuran (20 ml.), was pre-reduced with hydrogen with shaking at room temperature and atmospheric pressure, (time circa 10 mins.). The amine and 3β-acetoxy-16β-methyl-5α-pregna-9(11)16-dien-20-one (10 g.), dissolved in tetrahydrofuran (40 ml.) were added, and hydrogenated with the same conditions as in the pre-reduction process. When the uptake of hydrogen had ceased, the catalyst was filtered off on a bed of kieselguhr and the kieselguhr washed with chloroform (100 ml.).

The solution was evaporated down to dryness under reduced pressure. The solid residue was dissolved in methanol (14 ml.) and the solvent once more removed under reduced pressure. The solid residue was crystallised from methanol (14 ml.) at 0° overnight. The crystals were filtered off, washed with methanol and dried in vacuo at 60°.

(*a*) Triethylamine (10 ml.) was used as base, the uptake of hydrogen was 660 ml. in 23 mins., and this gave 3β-acetoxy-16β-methyl-5α-pregn-9(11)-en-20-one (8.94 g.; 88.9%) as needles, M.P. 109–111 $[\alpha]_D+31.7°$ (c., 1% in chloroform).

(*b*) Piperidine (5 ml.) was used as base, the uptake of hydrogen was 860 ml. in 120 mins., and this gave 3β-acetoxy-16β-methyl-5α-pregn-9(11)-en-20-one (8.07 g.; 80.2%) as needles, M.P. 110–111° $[\alpha]_D+30.5°$ (1% solution in chloroform).

(*c*) N-ethyl piperidine (5 ml.) was used as base, the uptake of hydrogen was 750 ml. in 22 mins., and this gave 3β-acetoxy-16β-methyl-5α-pregn-9(11)-en-20-one (8.05 g.; 80.0%) as needles, M.P. 111–112°, $[\alpha]_D=31.0°$ (c., 1% in chloroform).

(*d*) Pyridine (5 ml.) was used as base, the uptake of hydrogen was 890 ml. in 120 mins., and this gave 3β-acetoxy-16β-methyl-5α-pregn-9(11)-en-20-one (10.3 g.; 102.5%) in the crude uncrystallised state, M.P. 110–112°, $[\alpha]_D+31.2°$ (c., 1% in chloroform).

(*e*) Aniline (5 ml.) was used as base, the uptake of hydrogen was 770 ml. in 115 mins., and this gave 3β-acetoxy-16β-methyl-5α-pregn-9(11)-en-20-one (5.63 g.; 56%) as needles, M.P. 108–110°, $[\alpha]_D+29.9°$ (c., 1% in chloroform).

(*f*) 2% palladium oxide on calcium carbonate (4.25 g.) was used as catalyst, and triethylamine (10 ml.) was used as base. The uptake of hydrogen was 630 ml. in 30 mins., and this gave 3β-acetoxy-16β-methyl-5α-pregn-9(11)-en-20-one (8.5 g.; 84.5%) as needles, M.P. 107–110° $[\alpha]_D+29.3°$ (c., 1% in chloroform).

EXAMPLE 4 (STAGE 4)

*Chlorination of 3β-Acetoxy-16β-Methyl-5α-Pregn-9(11)-En-20-One*

Alternative procedures:

(*a*) The steroid (10.0 g.) was dissolved in methylene chloride (100 ml.) and water (10 ml.) was added. The mixture was stirred at 16° and treated with a solution of chlorine in carbon tetrachloride (1.56 N; 41.4 ml.; 20% excess) over 5 mins. After a further 5 mins., sodium bicarbonate solution (8%; 50 ml.) was added. The yellow colour rapidly faded. The organic layer was separated, washed with water and evaporated to dryness. The residue was crystallised from acetone (65 ml.) and water (15 ml.) to give 3β-acetoxy-9α:11β-dichloro-16β-methyl-5α-pregnan-20-one, (9.18 g.) M.P. 164–165°, $[\alpha]_D+48°$ ($CHCl_3$).

(*b*) Example 4(*a*) was repeated exactly but using only 5% excess chlorine solution (2.015 N; 28.0 ml.). Yield 8.99 g. of 3β-acetoxy-9α:11β-dichloro-16β-methyl-5α-pregnan-20-one, M.P. 163°, $[\alpha]_D+49.5°$ (c., 0.5 in $CHCl_3$).

(*c*) The steroid (10.0 g.) in methylene chloride (100 ml.) containing a suspension of sodium bicarbonate (5.0 g.) was stirred at 16° and treated with a solution of chlorine in carbon tetrachloride (1.86 N; 34.6 ml.; 20% excess) over 5 mins. The mixture was stirred for a further 5 mins. and then filtered. The filtrate was evaporated to dryness and the residue crystallised from acetone-water (4:1) to give 8.97 g. of 3β-acetoxy-9α:11β-dichloro-16β-methyl-5α-pregnan-20-one, M.P. 164–166° $[\alpha]_D+48°$ (c., 0.5 in $CHCl_3$).

(*d*) The steroid (300 g.) in methylene chloride (3 litres) containing a suspension of sodium bicarbonate (150 g.) was stirred at 4° (cooling bath) while chlorine (ca. 23 litres) was bubbled in over a period of 10 mins. The temperature of the reaction mixture rose to 12° at the end of this time. The excess chlorine was removed in a nitrogen stream, the suspension filtered and the filtrate evaporated under reduced pressure. The residue was crystallised from acetone (1.8 litres) and water (450 ml.) to yield 273.4 g. of 3β-acetoxy-9α:11β-dichloro-16β-methyl-5α-pregnan-20-one M.P. 167–169° $[\alpha]_D+47.8°$ (c., 0.5 in $CHCl_3$).

(*e*) The steroid (2 g.) was dissolved in glacial acetic acid (20 ml.) and a solution of chlorine (0.38 g.) in carbon tetrachloride (12.2 ml.) added as rapidly as possible with stirring. A saturated solution of sodium metabisulphite (20 ml.) was immediately added and stirring continued for about one minute. After separation of the phases the organic layer was washed with sodium bicarbonate solution and then with water. The organic solution was dried and evaporated under reduced pressure to a gum which was crystallised from aqueous acetone to give 1.44 g. of the dichloro compound M.P. 166–169° $[\alpha]_D+49.3°$ (c., 0.5, in $CHCl_3$).

(*f*) The steroid (19.8 g.) was dissolved in methylene chloride (200 ml.) and stirred rapidly with sodium acetate (2.8 g.) in water (20 ml.) at 5°. Chlorine gas was passed into the solution and after 10 minutes the solution became yellow in colour. The chlorine flow was stopped after a further minute and a suspension of sodium bicarbonate (5 g.) in water (50 ml.) was added and stirring continued for 5 mins. The organic layer was separated and washed with 8% aqueous sodium bicarbonate solution (65 ml.), water (50 ml.) and the washes back-extracted with methylene chloride (40 ml.). The extracts were combined and concentrated in vacuum and the residue dissolved in warm acetone (20 ml.) which was evaporated off, leaving a crystalline solid. The product was crystallised from acetone (100 ml.) containing water (30 ml.) and sodium acetate (0.8 g.) to give 9α:11β-dichloro-16β-methyl-5α-pregnan-20-one (21.2 g.), M.P. 164.5–165.5° (cap.), $[\alpha]_D+48°$ (c., 2 in $CHCl_3$).

EXAMPLE 5 (STAGE 5)

*Enol Acetylation of 3β-Acetoxy-9α:11β-Dichloro-16β-Methyl-5α-Pregnan-20-One*

The steroid (10.0 g.) was dissolved in carbon tetrachloride (50 ml.) and cooled to 0°. A solution of perchloric acid (60%; 0.1 ml.) in acetic anhydride (20 ml.) was added with stirring and the reaction mixture allowed to stand at 0° for 17 hrs. Water (6.0 ml.) was then added with stirring over 15 mins., the solution washed with water (2×25 ml.), saturated sodium bicarbonate solution (3×25 ml.), water (2×25 ml.) and evaporated to a gum of 3β:20-diacetoxy-9α:11β-dichloro-16β-methyl-5α-pregn-17(20)-ene.

EXAMPLE 6 (STAGES 4*a* AND 5*a*)

(*a*) *3β:20-diacetoxy-16β-methyl-5α-pregna-9(11):17(20)-diene.*—The 16-methyl compound (77 g.) prepared as in Example 3, in carbon tetrachloride (385 ml.) was cooled to 0°. Sixty-five ml. of a solution of perchloric acid (0.4 ml.) in acetic anhydride (84 ml.) also at 0° was added with stirring over 5 minutes with cooling. The mixture was kept at 0° overnight, diluted with water (11 ml.) and allowed to warm up to room temperature with stirring. The solution was washed with water, sodium bicarbonate solution and then with water. After drying over sodium sulphate, the organic layer containing the desired compound was obtained.

(*b*) *3β:20-diacetoxy-9α:11β-dichloro-16β-methyl-5α-pregn-17(20)-ene.*—A solution of the product (85.7 g.) in carbon tetrachloride (approximately 720 ml.) obtained from the Example 6(*a*) was stirred and treated with a solution of chlorine in carbon tetrachloride (1.46 N, 283 ml.) over a period of one minute. The reaction mixture was stirred and evaporated in vacuo to a volume of approximately 250 ml. This solution of the enol acetate was used in the next example.

EXAMPLE 7 (STAGE 6)

*3β:20-Diacetoxy-9α:11β-Dichloro-17:20-Epoxy-16β-Methyl-5α-Pregnane*

Alternative procedures:

(*a*) The solution of the enol acetate from the Example 6(*b*) was stirred at 35° and treated with an ethereal solution of monoperphthalic acid (2.55 N, 250 ml.) and the mixture kept at 35° for 3 hours. After removal of the phthalic acid, the organic layer was washed with water, sodium bicarbonate solution, dried and evaporated to a gum. This was crystallised from petrol and then from acetone to give 36.5 g. of the dichloroepoxide M.P. 166–170° $[\alpha]_D+68°$ (c., 0.64 in $CHCl_3$). The overall yield from $\Delta^{9(11)}$-16β-methyl-20-ketone was 35%.

(*b*) The product from Example 5, was taken up in chloroform (25 ml.) and treated with a solution of monoperphthalic acid (2.16 N) in ether (29 ml.). The reaction was kept at 35–40° for 3½ hrs., with occasional shaking. The precipitate was filtered off and washed with chloroform (2×8.5 ml.), dissolved in sodium hydroxide solution (8%; 25 ml.) and the solution extracted with chloroform (20 ml.). The filtrate was washed with water (2×50 ml.), saturated aqueous sodium bicarbonate solution (40 ml.) and water (50 ml.) and then used to back extract the aqueous washings from the sodium hydroxide solution. The combined chloroform solutions were evaporated under reduced pressure to give a foam of 3β:20-diacetoxy-9α:11β-dichloro-17:20-epoxy-16β-methyl-5α-pregnane.

(*c*) Monoperphthalic acid in ether (26.5 ml.); 2.4 N was added to a solution of enol acetate (10 g.) in chloroform (25 ml.). After allowing the mixture to stand overnight at room temperature, it was filtered and washed successively with 8% sodium bicarbonate solution and water. The filtered phthalic acid was dissolved in 2 N-sodium hydroxide and the solution extracted with chloroform which was used to back extract the previous washes. The combined extracts were evaporated to dryness and the residue crystallised from acetone (100 ml.) to yield the epoxide, 8.54 g., M.P. 163–165°, $[\alpha]_D+68.0$ (c., 1.0 in $CHCl_3$). The mother liquors were evaporated to 20 ml. to obtain a second crop, 0.82 g., M.P. 161–162°, $[\alpha]_D+61.3°$ (c., 1.0 in $CHCl_3$).

(*d*) Enol acetate (10 g.) was treated with monoperphthalic acid in ether as in (*c*), but in solution in methylene chloride (25 ml.), at room temperature overnight. The product was isolated in the same manner to yield the epoxide, 8.51 g., M.P. 162–163°, $[\alpha]_D+68.3°$ (c., 1.0 in $CHCl_3$) and a second crop 0.87 g. M.P. 161–164°, $[\alpha]_D+63.3°$ (c., 1.0 in $CHCl_3$).

EXAMPLE 8 (STAGE 7)

*9α:11β-Dichloro-3β:17α-Dihydroxy-16β-Methyl-5α-Pregnan-20-One*

Alternative procedures:

(*a*) *Hydrolysis with sulphuric acid.*—The crude epoxide from Example 7(*b*) was dissolved in methylene chloride (143 ml.), containing methanol (122 ml.), the solution cooled to 18° and treated with a mixture of sulphuric acid (25.5 ml.), water (25.5 ml.) and methanol (122 ml.) with stirring during 5 mins. The solution was allowed to stand at room temperature for 16 hrs. and then diluted with water (1 litre) with vigorous stirring. Stirring was continued for 30 mins., the precipitate filtered off, washed with water (70 ml.), saturated aqueous sodium bicarbonate solution (2×20 ml.), water (2×15 ml.), industrial methylated spirit (2×10 ml.) and chloroform (3×7.5 ml.). The 9α:11β-dichloro-3β:17-dihydroxy-16β-methyl-5α-pregnan-20-one was dried at 60° for 1 hr. under reduced pressure, 4.81 g., M.P. 195–197° (decomp.) $[\alpha]_D+75°$ (c., 0.5 in dioxan).

(*b*) *Hydrolysis with sodium methoxide.*—A solution of crude 3β:20-diacetoxy-9α:11β-dichloro-16β-methyl-17:20-epoxy-5α-pregnane (prepared from 2.545 kg. of 3β-acetoxy-9α:11β-dichloro-16β-methyl-5α-pregnan-20-one prepared as in Example 7(*c*), the phthalic acid being filtered off but no aqueous washings being used) was neutralised with sodium methoxide in methanol and at 25° was stirred for 1½ hours with sodium methoxide in methanol (2.67 litres of 1.9 N). Water (25.5 litres) was added to the reaction mixture and the suspension cooled to 0°. The precipitated steroid was collected by filtration, washed with water (25 litres) methanol (3 litres) and methylene chloride (3×0.75 litre) to give 9α:11β-dichloro-3β:17α-dihydroxy-5α-pregnan-20-one in 72.2% yield (from 3β-acetoxy-9α:11β-dichloro-16β-methyl-5α-pregnan-20-one). 1.73 kg., M.P. 197° (decomp.) (cap, corr.), $[\alpha]_D+76°$ (c., 0.5 in dioxan), I.R. spectrum indicated the presence of less than 1% of the 3β-acetoxy compound.

(*c*) *Hydrolysis with Sodium Hydroxide.*—Crystalline 3β:20-diacetoxy-9α:11β-dichloro-17:20-epoxy-16β-methyl-5α-pregnane (5 g.) was dissolved in methylene chloride (20 ml.) containing diethyl ether (14 ml.). Methanol (2.1 ml.) and sodium hydroxide in 90% methanol (2 N, 10.22 ml.; 2 moles/mole of steriod) were added and the solution stood at 24°. Some of the product crystallised out of the reaction mixture and after 2 hours the suspension was stirred vigorously, diluted with water (50 ml.), cooled to 16° and filtered.

The residue was washed free from alkali with distilled water, washed with methanol (10 ml.), methylene chloride (3×3.3 ml.) and dried in vacuum at 60° to give 9α:11β-dichloro - 3β:17α - dihydroxy - 5α - pregnan - 20 - one in 97% yield (4.04 g.), M.P. (decomp.) 197° (cap. corr.), $[\alpha]_D+75.7°$ (c., 0.5 in dioxan), I.R. spectrum indicated the presence of 1% of the 3β-acetoxy-compound.

EXAMPLE 9 (STAGE 8)

*21-Bromo - 9α:11β - Dichloro - 3β:17α - Dihydroxy-16β-Methyl-5α-Pregnan-20-One*

3β:17α-dihydroxy - 9α:11β - dichloro-16β-methyl-5α-pregnan-20-one (60 g.) was suspended in chloroform (1.5 litres) and 9.95 N hydrogen chloride in ethyl alcohol (100 ml.) added. The suspension was stirred for 15 minutes. Bromine (7.74 ml.) in chloroform (150 ml.) was added over 45 minutes and the resulting solution was stirred for a further 5 minutes. A saturated aqueous solution of sodium bicarbonate (900 ml.) was added and the mixture stirred rapidly for 15 minutes. The precipitated solid was filtered off, washed well with water and dried in vacuo for 4 hrs. at 60°.

Wt.=58.5 g., M.P. 183.5° d. $[\alpha]_D=91°$ (c., 0.4 in dioxan).

A second crop was obtained by concentration of the mother liquors to a volume of ca. 100 ml. The precipitated solid was filtered off and washed with acetone (10 ml.).

Wt.=4.72 g., M.P. 182° d. $[\alpha]_D=+83°$ (c., 0.4 in dioxan).

EXAMPLE 10 (STAGE 9)

*21-Acetoxy - 9α:11β - Dichloro - 3β:17α - Dihydroxy-16β-Methyl-5α-Pregnan-20-One*

21-bromo - 9α:11β - dichloro-3β:17α-dihydroxy-16β-methyl-5α-pregnan-20-one (3.98 g.) was refluxed in acetone (240 ml.) containing potassium acetate (9.1 g.) for 2 hours. The suspension was evaporated in vacuo to 50 ml., distilled water (400 ml.) was added and the precipitate filtered off, washed with water and dried in vacuo to yield the 21-acetate (3.82 g.) M.P. 162° (decomp.) $[\alpha]_D+96°$ (c., 0.38 in dioxan).

EXAMPLE 11 (STAGE 10)

*21-Acetoxy - 3β:17α - Dihydroxy - 16β - Methyl - 5α - Pregn-9(11)-En-20-One*

21-acetoxy - 9α:11β - dichloro - 3β:17α - dihydroxy-16β-methyl-5α-pregnan-20-one (3.5 g.) in tetrahydrofuran (17.5 ml.) containing triethylamine (3.06 ml.) and water (3.5 ml.) was shaken with 10% palladised charcoal (0.875 g.) in an atmosphere of hydrogen. The hydrogen uptake (218 ml.) was complete in 40 minutes. The catalyst was filtered off, washed with methylene chloride (10 ml.) and the filtrate evaporated to dryness under reduced pressure. The resulting solid was triturated with water, filtered off, washed well with water and dried in vacuo at 100°, to give 21-acetoxy - 3β:17α - dihydroxy - 16β - methyl-5α-pregn-9(11)-en-20-one.

Wt.=2.88 g., M.P. 199–201° $[\alpha]_D=+59°$ (c., 0.5 in dioxan).

EXAMPLE 12 (STAGE 11)

*21-Acetoxy - 17α - Hydroxy - 16β - Methyl - 5α - Pregn-9(11)-Ene-3:20-Dione*

21-acetoxy - 3β:17α - hydroxy - 16β - methyl-5α-pregn-9(11)-en-20-one (2.0 g.) prepared as in Example 11 was dissolved in boiling acetone (56 ml.) and cooled to 42°. Potassium dichromate (0.528 g.) in water (7.6 ml.) containing sulphuric acid (0.6 ml.) was added with stirring. The excess chromic acid at the end of 5 minutes was destroyed by adding sodium metabisulphite solution. Water (200 ml.) was slowly added and the crystalline precipitate filtered off, washed with water and crystallised from acetone to give the 3-ketone (1.63 g.) M.P. 180–182° $[\alpha]_D+69°$. This material proved to be solvated with acetone and on drying at 100° for one hour in vacuo the sample showed M.P. 190–192° $[\alpha]_D+85°$ (c., 0.3 in dioxan).

EXAMPLE 13 (STAGE 10A)

*21-Acetoxy - 9α:11β - Dichloro - 17α - Hydroxy - 16β - Methyl-5α-Pregnane-3:20-Dione*

Alternative methods:

(*a*) 21-acetoxy - 9α:11β - dichloro - 3β:17α - dihydroxy-16β-methyl-5α-pregnan-20-one (5 g.) was added to a mixture of 2.1 N chlorine in acetic acid (29.75 ml.) and N sodium acetate in acetic acid (65 ml.). The reaction was completed by stirring overnight at room temperature. Water (700 ml.) was added and the precipitated solid was filtered off, washed with water and dried at 60° in vacuo.

Wt.=4.7 g., M.P. 182° (d.) $[\alpha]_D+101.6°$ (c., 1 in dioxan).

(*b*) 21-acetoxy - 9α:11β - dichloro - 3β:17α - dihydroxy-16β-methyl-5α-pregnan-20-one (5 g.) in actone (150 ml.) was treated dropwise at room temperature with 8 N chromic acid (3.05 ml.) until the reaction mixture was a persistent orange brown colour. The excess oxidising agent was destroyed with industrial methylated spirits and the mixture concentrated to low bulk by distillation under reduced pressure. Water (500 ml.) was added and the precipitated solid was filtered off, washed with water and dried at 60° in vacuo.

Wt.=4.6 g., M.P. 181.5° (d.), $[\alpha]_D+97°$ (c., 1 in dioxan).

EXAMPLE 14 (STAGE 11A)

*21-Acetoxy - 17α - Hydroxy - 16β - Methyl - 5α - Pregn-9(11)-Ene-3:20-Dione*

(*a*) *Using Palladium Catalyst.*—21-acetoxy - 9α:11β - dichloro - 17α - hydroxy - 16β - methyl-5α-pregnane-3:20-dione (4.3 g.) in tetrahydrofuran (21.5 ml.) containing triethylamine (3.78 ml.) and water (2.22 ml.) was added to 10% palladised charcoal (1.084 g.) pre-reduced in tetrahydrofuran (8.6 ml.; hydrogen uptake 59 ml.). The mixture was shaken in an atmosphere of hydrogen until absorption stopped (262 ml. in 10 mins.). The catalyst was filtered off and extracted with hot ethyl acetate (3×50 ml.). The extracts were added to the filtrate, concentrated to near dryness under reduced pressure and the residue diluted with water (150 ml.). The solid was harvested by filtration, washed with water and dried at 100° in vacuo for 6 hrs. Wt. 3.3 g., M.P. 188–191°, $[\alpha]_D+81°$ (c., 0.5 in dioxan).

(*b*) *Using zinc/acetic acid.* — 21-acetoxy-9α:11β-dichloro - 17α - hydroxy - 16β - methyl - 5α - pregnane-3:20-dione (75 g.) was dissolved in a mixture of acetic acid (560 ml.) and methylene chloride (188 ml.) containing anhydrous sodium acetate (47 g.). Zinc dust, activated by washing with 2 N-hydrochloric acid, water, methanol and dried (150 g.) was added and the mixture stirred at 50–60° for 0.75 hr. The mixture was filtered hot and the zinc washed with methylene chloride (2×50 ml.) and water (50 ml.). The filtrate was evaporated at ca. 50° under reduced pressure until all the methylene chloride had been distilled off. The acetic acid solution was cooled to room temperature and diluted with water (560 ml.). The precipitated steroid was filtered off, washed with 50% aqueous acetic acid (2×100 ml.), water (5×200 ml.) and dried at 95° under vacuum for 3 hrs. to give the dechlorinated product (61 g.; 95.5%), M.P. 186–188° (cap.), $[\alpha]_D+80.5°$ (c., 0.5 in dioxan), infra-red spectrum identical with specimen obtained in Example 14(*a*).

EXAMPLE 15 (STAGE 12)

*3β-Acetoxy-9α:11β-Dichloro-17α-Hydroxy-16β-Methyl-5α-Pregnan-20-One*

3β:20 - diacetoxy - 9α:11β - dichloro - 17(20) - epoxy-16β-methyl-5α-pregnane (10 g.) was dissolved in glacial acetic acid (600 ml.) containing concentrated sulphuric acid (2.95 ml.) and water (20 ml.) and the clear colourless solution was left at room temperature (23°). After three hours the reaction solution was poured into water (2 litres) and the steroid was extracted with methylene chloride (100 ml. and 2×50 ml.). The organic extracts were combined and washed with water (200 ml.), 8% sodium carbonate solution (200 ml.), and water (200 ml.). The solution was concentrated at atmospheric pressure to a volume of 45 ml., petroleum ether (B.P. 100–120°; 105 ml.) was added and the distillation was continued to remove the last of the methylene chloride. The solution was cooled to 14° and the crystalline product was filtered off and washed with petroleum ether (B.P. 100–120°; 10 ml.) giving needles (7.2 g.; 78.5%), M.P. 180° (decomp.), $[\alpha]_D+46°$ (c., 1 in $CHCl_3$). A similar sample, after several crystallisations from acetone, gave 3β - acetoxy - 9α:11β - dichloro - 17α - hydroxy-16β - methyl - 5α - pregnan - 20 - one with M.P. 183° (decomp.) $[\alpha]_D+46.5°$ ($CHCl_3$), + 65.6° (c., 1 in dioxan). (Found: C, 63.05; H, 7.8; Cl, 15.5; $C_{24}H_{36}O_4Cl_2$ requires C, 62.8; H, 7.9; Cl, 15.4%.)

EXAMPLE 16 (STAGE 13)

*3β-Acetoxy-17α-Hydroxy-16β-Methyl-5α-Pregn-9(11)-En-20-One*

Palladium oxide on charcoal (10% Pd; 1.4 g.) was slurried with tetrahydrofuran (35 ml.) and shaken in hydrogen until absorption was complete. 3β-Acetoxy-9α:11β - dichloro - 17α - hydroxy - 16β - methyl - 5α-pregnan-20-One (7 g.), in tetrahydrofuran (70 ml.) containing triethylamine (6.35 ml.), was added and the mixture was shaken in an atmosphere of hydrogen until uptake of the gas had ceased (392 ml., 1,045 molar equivalents in 32 minutes). The catalyst was collected by filtration and washed with water (30 ml.) and methylene chloride (150 ml.). The colourless filtrate was washed twice with water (300 ml. and 140 ml.) and the solvent was distilled from the organic phase in vacuo. The residual white solid was dissolved in hot methanol (40 ml.) and the solution was evaporated in order to remove the last traces of methylene chloride. The residue was crystallised from methanol (42 ml.) to give 4.11 g. (69.5%) of material M.P. 175–177°, $[\alpha]_D+32.6°$ dioxan).

Two further crystallisations from methanol gave 3β-acetoxy - 17α - hydroxy - 16β - methyl - 5α - pregn-9(11)-en-20-one (2.96 g.), M.P. 177–179°, $[\alpha]_D+34.1°$ (dioxan) and +3.9° (c., 1 in $CHCl_3$). (Found: C, 73.9; H, 9.45. $C_{24}H_{36}O_4$ requires C, 74.2; H, 9.35%.)

EXAMPLE 17

*3β:17α-Dihydroxy-16β-Methyl-5α-Pregn-9(11)-En-20-One*

(*a*) By hydrolysis of 3β - acetoxy - 17α - hydroxy-16β-*methyl - 5α - pregn-9(11)-en-20-one (Stage 14)*.—3β-acetoxy - 17α - hydroxy - 16β - methyl - 5α - pregn - 9(11)-en-20-one (9.32 g.) in methanol (330 ml.) was boiled under reflux for 140 minutes with potassium bicarbonate (1.5 g.) in water (110 ml.). Dilution of the hot solution with water (ca. 500 ml.), cooling and filtration gave the 3β-hydroxy compound (8.15 g., 98%), $[\alpha]_D+33.5°$ (c., 0.9 in dioxan). Recrystallisation brought the rotation to $[\alpha]_D+36°$ (c., 0.9 in dioxan).

(*b*) *From 9α:11β - dichloro - 3β:17α - dihydroxy - 16β-methyl-5α-pregnan-20-one (Stage 18)*.—(i) *By hydrogenolysis*: 9α:11β - dichloro-3β:17α-dihydroxy-16β-methyl-5α-pregnan-20-one (1.5 g.) in tetrahydrofuran (120 ml.) containing triethylamine (1.52 ml.) was added to a prereduced suspension of 5% palladium on charcoal catalyst (200 mg.) in tetrahydrofuran (30 ml.) and the mixture was shaken in an atmosphere of hydrogen. Hydrogenation was complete in 100 min. The reaction mixture was filtered and the precipitate thoroughly washed with hot chloroform. The filtrate was washed with water, dried and evaporated to dryness leaving a white solid (1.24 g., 100%), $[\alpha]_D+38.5°$ (c., 0.46 in dioxan). Two crystallisations from ethyl alcohol gave a pure sample of 3β:17α-dihydroxy - 16β - methyl - 5α - pregn - 9(11) - en - 20-one, M.P. 217–220°, $[\alpha]_D+39°$ (in dioxan). (Found: C, 76.0; H, 9.5. Calc. for $C_{22}H_{34}O_3$: C, 76.2; H, 9.9%.)

(ii) *By reduction with zinc-acetic acid:* The dichlorodiol (500 mg.) was dissolved in a mixture of acetic acid (50 ml.) and methylene chloride (50 ml.) and treated with zinc dust (2 g.) at room temperature with stirring for 30 mins. The excess zinc was filtered off, the filter cake was thoroughly washed and the filtrate was poured into a large volume of water. The mixture was thoroughly extracted into chloroform, the extracts were washed with water, saturated sodium bicarbonate solution and finally with water again. The dried extract was evaporated to dryness leaving the $\Delta^{9(11)}$-diol (412 mg., 99%) $[\alpha]_D+38°$ (c., 0.8 in dioxan). Crystallisation from ethyl alcohol gave a first crop (245 mg.) M.P. 218–220° (decomp.), $[\alpha]_D+38°$ (c., 0.83) and a residue $[\alpha]_D+36.5°$ (c., 0.8) (both in dioxan).

(iii) *By reduction with chromous chloride:* The dichlorodiol (1 g.) in dioxan (200 ml.) was treated with stirring and under nitrogen with excess chromous chloride solution (40 ml., 2.5 N). After 1 hour the reaction mixture was poured into water, the precipitate was filtered off, washed thoroughly with water and dried in vacuo leaving the crude $\Delta^{9(11)}$-diol (823 mg., 99%), $[\alpha]_D+35°$ (c., 0.78). Crystallisation from ethyl alcohol gave a first crop (504 mg. 60%), $[\alpha]_D+37°$ (c., 0.77), recrystallisation of which gave a standard sample of 3β:17α-dihydroxy-16β-methyl-5α-pregn-9(11)-en-20-one (366 mg.) $[\alpha]_D+38°$.

EXAMPLE 18 (STAGES 15 AND 16)

*21-Acetoxy-3β:17α-Dihydroxy-16β-Methyl-5α-Pregn-9(11)-En-20-One*

3β:17α-dihydroxy-16β-methyl - 5α - pregn-9(11)-en-20-one (5 g.) in purified dioxan (200 ml.) was treated at room temperature with a solution of hydrogen bromide in dioxan (3.66 N; 4.44 ml.), and then a solution of bromine (1.05 molecular equivalents) in dioxan (29.2 ml.) was added to the stirred solution during 45 min. After a further 30 min. the yellow solution was poured into water (ca. 1500 ml.) and the precipitated crude 21-bromo-compound (6.0 g.), (found: Br. 18.05; $C_{22}H_{33}O_3Br$ requires Br, 18.8%) was collected by filtration, washed with water, and dried.

The crude bromo-compound (1.8 g.) in acetone (35 ml.) was added to a suspension of potassium acetate, prepared by boiling potassium bicarbonate (4.5 g.) with acetic acid (2.7 ml.) in acetone (25 ml.) for 15 min. The mixture was boiled under reflux for 2.5 hr., the acetone was almost completely removed in vacuo, and the residue was diluted with water to precipitate the crude 21-acetoxy-compound (1.68 g.), which was collected by filtration, washed with water and dried.

The crude 21-acetoxy-compound (1.0 g.) was chromatographed on magnesium trisilicate. Elution with benzene and 5% ethyl acetate gave mixtures, then 10% ethyl acetate in benzene eluted 21-acetoxy-3β:17α-dihydroxy-16β-methyl-5α-pregn-9(11)-en-20-one, which was recrystallised from ethyl acetate to give prisms (224 mg.), M.P. 195–197°, $[\alpha]_D+56.0$ (c., 0.84 in $CHCl_3$).

EXAMPLE 19 (STAGE 17)

*Chlorination of 21-Acetoxy-3β:17α-Dihydroxy-16β-Methyl-5α-Pregn-9(11)-En-20-One*

A solution of sodium acetate (4.2 g.) in water (30 ml.)

was added to 21-acetoxy-3β:17α-dihydroxy-16β-methyl-5α-pregn-9(11)-en-20-one (10 g.) dissolved in methylene chloride (360 ml.) and the mixture cooled to 0° C. Chlorine was passed into the solution at a steady rate with vigorous stirring until a yellow colour persisted. A saturated solution of sodium bicarbonate (34 ml.) was added and the mixture stirred for 5 minutes. The organic phase was separated and washed with water (200 ml.) and then evaporated under reduced pressure at ca. 30° C. Methyl cyanide (80 ml.) was added to dissolve the resultant froth and kept at 0° C. overnight. The crystalline product was collected by filtration, washed with methyl cyanide (10 ml.) and dried in vacuo at 60° C. for 2 hours to yield 21-acetoxy - 9α:11β - dichloro - 3β:17α - dihydroxy-16β-methyl-5α-pregnan-20-one (4.87 g.), M.P. 164–166° C. (decomp.), $[\alpha]_D+$ 92.9° (c., 0.5 in dioxan). Found: Cl, 15.0. $C_{24}H_{36}O_5Cl_2$ requires Cl, 14.9.

EXAMPLE 20 (STAGE 19)

*9α:11β-Dichloro-3β:17α-Dihydroxy-16β-Methyl-5α-Pregnan-20-One*

(*a*) *By chlorination with molecular chlorine.*—750 mg. of the crude hydrogenation product described in Example 22 of application No. 40,268, filed July 18, 1960, in chloroform (110 ml.) was treated with chlorine (1.1 mol. eq.) in carbon tetrachloride (6.25 ml.) at room temperature for 3 minutes. The chloroform solution was washed successively with dilute sodium thiosulphate solution and water, dried ($MgSO_4$) and evaporated in vacuo. Trituration of the residue with cold acetone gave a white solid which when crystallised from chloroform furnished 9α:11β - dichloro - 3β:17α - dihydroxy - 16β - methyl-5α-pregnan-20-one (335 mg.), M.P. 201–204°, $[\alpha]_D+75°$ (c., 0.52 in dioxan).

(*b*) *Chlorination with N-chlorosuccinimide in acetic acid containing lithium chloride.*—To a stirred suspension of 3β:17α - dihydroxy-16β-methyl-5α-pregn-9(11)-en-20-one (400 mg.) and lithium chloride (2.7 g.) in glacial acetic acid (40 ml.) in the dark and under an atmosphere of nitrogen was added N-chlorosuccinimide (200 mg., 94%) followed immediately by a solution of hydrogen chloride (47 mg.) in tetrahydrofuran (0.77 ml. peroxide free). After 1 hr. the reaction mixture was poured into dilute sodium acetate solution. The precipitate was collected by filtration, washed with water, dried in vacuo and triturated with ether (25 ml.). The resulting 9α,11β-dichloro-3β,17α-dihydroxy - 16β - methyl-5α-pregnan-20-one, the I.R. spectrum of which agreed substantially with those obtained for the same compound obtained in Stage 7.

We claim:

1. As new compounds, compounds of the general formula:

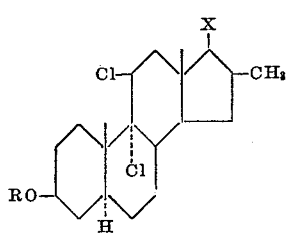

in which X is a member selected from the group consisting of

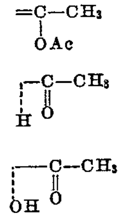

and

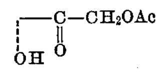

Ac being an acyl group derived from a lower alkanoic acid, and R is a member selected from the group consisting of a hydrogen atom and an acyl group derived from a lower alkanoic acid.

2. 3β:20 - diacetoxy - 9α:11β - dichloro - 16β - methyl-5α-pregn-17(20)-ene.

3. 3β - acetoxy - 9α:11β - dichloro - 16β - methyl - 5α - pregnan-20-one.

4. 9α:11β - dichloro - 3β:17α - dihydroxy - 16β - methyl-5α-pregnan-20-one.

5. 21 - acetoxy - 9α:11β - dichloro - 3β:17α - dihydroxy-16β-methyl-5α-pregnan-20-one.

6. A process for the preparation of a compound having the formula

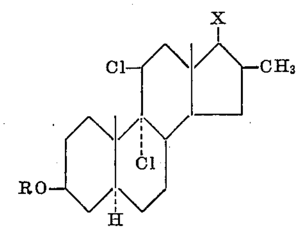

in which X is a member selected from the group consisting of

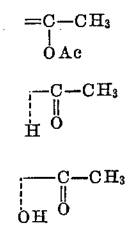

and

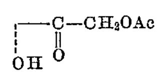

Ac being an acyl group derived from a lower alkanoic acid, and R is a member selected from the group consisting of a hydrogen atom and an acyl group derived from a lower alkanoic acid, which process comprises reacting with molecular chlorine in a solvent selected from the group consisting of methylene chloride, carbon tetrachloride, chloroform and acetic acid, a compound having the formula

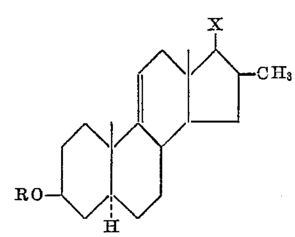

in which X and R have the meanings set forth above to form said first-mentioned compound and hydrogen chloride by simultaneous substitution by chlorine elsewhere in the steroid molecule, and removing said hydrogen chloride immediately upon its formation before it can effect isomerisation of said first-mentioned compound.

7. A process as claimed in claim 6 in which the solvent is water-immiscible and has added to it water into which hydrogen chloride produced during the process is extracted.

8. A process for the preparation of a 3β:20-dilower-alkanoyloxy - 9α:11β - dichloro - 17:20 - epoxy - 16 - methyl-5α-pregnane which comprises the steps of reacting a 3β-loweralkanoyloxy-16-methyl-5α-pregn-9(11)-ene-20-one with molecular chlorine and a lower alkanoic acid anhydride to form a 3β:20-diloweralkanoyloxy-9α:11β-dichloro-16-methyl-5α-pregn-17(20)-ene and epoxidising said last-mentioned compound to form the desired 3β:20-diloweralkanoyloxy-9α:11β-dichloro-17:20-epoxy-16-methyl-5α-pregnane.

9. A process as claimed in claim 8 in which the resulting 3β:20-diloweralkanoyloxy-9α:11β-dichloro-17:20-epoxy-16-methyl-5α-pregnane is thereafter hydrolysed to form 3β:17α-dihydroxy-9α:11β-dichloro-16-methyl-5α-pregnan-20-one, the latter is brominated at the 21-position and the resultant bromo compound is reacted with an alkali metal salt of a lower alkanoic acid to form a 21-loweralkanoyloxy-9α:11β-dichloro-3β:17α-dihydroxy-16-methyl-5α-pregnan-20-one.

10. A process as claimed in claim 9 in which the resulting 21-loweralkanoyloxy-9α:11β-dichloro-3β:17α-dihydroxy-16-methyl-5α-pregnan-20-one is dechlorinated to form a 21-acyloxy-3β:17α-dihydroxy-16-methyl-5α-pregn-9(11)-ene-20-one and oxidising said last-mentioned compound at the 3-position to form a 21-loweralkanoyloxy-17α-hydroxy-16-methyl-5α-pregn-9(11)-en-3:20 dione.

11. A process as claimed in claim 9 in which the resulting 21-loweralkanoyloxy-9α:11β-dichloro-3β:17α-dihydroxy-16-methyl-5α-pregnan-20-one is first oxidised at the 3-position to form a 3-ketone and is then dechlorinated to form a 21-loweralkanoyloxy-17α-hydroxy-16-methyl-5α-pregn-9(11)-ene-3:20-dione.

12. A process as claimed in claim 8 in which the resulting 3β:20-diloweralkanoyloxy-9α:11β-dichloro-17:20-epoxy-16-methyl-5α-pregnane is thereafter hydrolysed to form a 3β-loweralkanoyloxy-9α:11β-dichloro-17α-hydroxy-16-methyl-5α-pregnan-20-one, which is then dechlorinated to a 3β-loweralkanoyloxy-17α-hydroxy-16-methyl-5α-pregn-9(11)-en-20-one and the latter hydrolysed to 3β:17α-dihydroxy-16-methyl-5α-pregn-9(11)-en-20-one.

13. A process as claimed in claim 8 in which the resulting 3β:20-diloweralkanoyloxy-9α:11β-dichloro-17:20-epoxy-16-methyl-5α-pregnane is thereafter hydrolysed to form 3β:17α-dihydroxy-9α:11β-dichloro-16-methyl-5α-pregnan-20-one, and the latter is dechlorinated to form 3β:17α-dihydroxy-16-methyl-5α-pregn-9(11)-en-20-one.

14. A process as claimed in claim 12 in which the resulting 3β:17α-dihydroxy-16-methyl-5α-pregn-9(11)-en-20-one is brominated at the 21-position and the 21-bromo compound is reacted with an alkali metal salt of a lower alkanoic acid to form a 21-loweralkanoyloxy-3β:17α-dihydroxy-16-methyl-5α-pregn-9(11)-en-20-one.

15. A process as claimed in claim 13 in which the resulting 3β:17α-dihydroxy-16-methyl-5α-pregn-9(11)-en-20-one is brominated at the 21-position and the 21-bromo compound is acyloxylated to form a 21-loweralkanoyloxy-3β:17α-dihydroxy-16-methyl-5α-pregn-9(11)-en-20-one.

References Cited in the file of this patent

UNITED STATES PATENTS 2,786,856 Cutler et al. ........... Mar. 26, 1957
2,894,963 Gould et al. ........... July 14, 1959

OTHER REFERENCES

Robinson et al.: J.A.C.S., 81, 2191–2199 (1959).
Slates et al.: J.A.C.S., 81, 5472–5475 (1959).